United States Patent
Blanchflower et al.

(10) Patent No.: US 12,299,831 B2
(45) Date of Patent: May 13, 2025

(54) COLLABORATIVE AUGMENTED REALITY

(71) Applicant: CrowdStrike, Inc., Sunnyvale, CA (US)

(72) Inventors: Sean Blanchflower, Cambridge (GB); Timothy Halbert, Cambridge (GB)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/419,264

(22) Filed: Jan. 22, 2024

(65) Prior Publication Data
US 2024/0161426 A1 May 16, 2024

Related U.S. Application Data

(63) Continuation of application No. 17/971,848, filed on Oct. 24, 2022, now Pat. No. 11,908,092, which is a
(Continued)

(51) Int. Cl.
*G06T 19/00* (2011.01)
*A63F 13/50* (2014.01)
(Continued)

(52) U.S. Cl.
CPC ............ *G06T 19/006* (2013.01); *A63F 13/50* (2014.09); *A63F 13/65* (2014.09); *A63F 13/655* (2014.09); *G06F 3/1438* (2013.01); *G06F 3/1462* (2013.01); *G06T 15/20* (2013.01); *G06V 10/751* (2022.01); *G06V 20/80* (2022.01); *A63F 2300/1093* (2013.01); *A63F 2300/5533* (2013.01); *A63F 2300/69* (2013.01);
(Continued)

(58) Field of Classification Search
CPC . G06T 19/006; G06T 15/20; G06T 2219/024; A63F 13/50; A63F 13/65; A63F 13/655; A63F 13/10; A63F 13/12; A63F 2300/1093; A63F 2300/5533; A63F 2300/69; G06F 3/1438; G06F 3/1462; G06K 9/00577; G06K 9/00671; G06K 9/2081; G06K 9/6202; G06K 9/00744; G06K 9/46; G06K 2209/21; G06V 10/751; G06V 10/40; G06V 20/80; G06V 20/46
USPC ............................................ 382/103; 345/2.2
See application file for complete search history.

(56) References Cited

U.S. PATENT DOCUMENTS

| 6,349,337 B1 | 2/2002 | Parsons et al. |
| 7,283,671 B2 | 10/2007 | Hiroi et al. |

(Continued)

FOREIGN PATENT DOCUMENTS

EP    2400464 A2    12/2011

OTHER PUBLICATIONS

International Search report and Written Opinion issued for PCT Application No. PCT/EP2012/070893, mailed Sep. 2, 2013, 8 pages.
(Continued)

*Primary Examiner* — Tom V Sheng
(74) *Attorney, Agent, or Firm* — Womble Bond Dickinson (US) LLP

(57) ABSTRACT

Augmented reality presentations are provided at respective electronic devices. A first electronic device receives information relating to modification made to an augmented reality presentation at a second electronic device, and the first electronic device modifies the first augmented reality presentation in response to the information.

20 Claims, 6 Drawing Sheets

Related U.S. Application Data continuation of application No. 17/355,159, filed on Jun. 22, 2021, now Pat. No. 11,508,136, which is a continuation of application No. 16/732,673, filed on Jan. 2, 2020, now Pat. No. 11,074,758, which is a continuation of application No. 16/056,074, filed on Aug. 6, 2018, now Pat. No. 10,535,200, which is a continuation of application No. 15/430,143, filed on Feb. 10, 2017, now Pat. No. 10,068,381, which is a continuation of application No. 14/437,165, filed as application No. PCT/EP2012/070893 on Oct. 22, 2012, now Pat. No. 9,607,438.

(51) Int. Cl.
  *A63F 13/65*    (2014.01)
  *A63F 13/655*   (2014.01)
  *G06F 3/14*    (2006.01)
  *G06T 15/20*   (2011.01)
  *G06V 10/75*   (2022.01)
  *G06V 20/80*   (2022.01)
  *G06V 10/40*   (2022.01)
  *G06V 20/40*   (2022.01)

(52) U.S. Cl.
  CPC ........ *G06T 2219/024* (2013.01); *G06V 10/40* (2022.01); *G06V 20/46* (2022.01)

(56) References Cited

U.S. PATENT DOCUMENTS

| | | | | |
|---|---|---|---|---|
| 8,493,353 | B2* | 7/2013 | Blanchflower | G06F 16/583 |
| | | | | 345/173 |
| 8,601,379 | B2 | 12/2013 | Marks et al. | |
| 8,738,754 | B2* | 5/2014 | Windell | H04L 41/0686 |
| | | | | 345/632 |
| 8,902,254 | B1 | 12/2014 | Laughlin et al. | |
| 9,066,200 | B1* | 6/2015 | Loxam | G06T 11/60 |
| 9,105,011 | B2* | 8/2015 | Calman | G06V 20/20 |
| 9,361,729 | B2 | 6/2016 | Narayanan | |
| 9,384,395 | B2* | 7/2016 | Ryu | H04N 5/00 |
| 9,384,588 | B2* | 7/2016 | Liu | G06T 17/00 |
| 9,484,588 | B2 | 11/2016 | Kim et al. | |
| 9,607,438 | B2 | 3/2017 | Blanchflower et al. | |
| 10,068,381 | B2 | 9/2018 | Blanchflower et al. | |
| 10,535,200 | B2 | 1/2020 | Blanchflower et al. | |
| 11,074,758 | B2 | 7/2021 | Blanchflower et al. | |
| 2008/0074424 | A1* | 3/2008 | Carignano | G06T 19/006 |
| | | | | 345/473 |
| 2011/0293140 | A1 | 12/2011 | Wagner et al. | |
| 2011/0310120 | A1 | 12/2011 | Narayanan | |
| 2012/0001832 | A1 | 1/2012 | Braghis et al. | |
| 2012/0025974 | A1 | 2/2012 | Richey et al. | |
| 2012/0038668 | A1* | 2/2012 | Kim | G06T 11/60 |
| | | | | 345/633 |
| 2012/0078667 | A1 | 3/2012 | Denker et al. | |
| 2012/0105447 | A1* | 5/2012 | Kim | G06V 20/20 |
| | | | | 345/419 |
| 2012/0162207 | A1 | 6/2012 | Hwang et al. | |
| 2012/0162254 | A1* | 6/2012 | Anderson | H04N 21/431 |
| | | | | 345/633 |
| 2012/0194548 | A1 | 8/2012 | Ahn | |
| 2012/0232966 | A1* | 9/2012 | Calman | G06Q 30/02 |
| | | | | 705/14.1 |
| 2012/0242842 | A1* | 9/2012 | Yoshigahara | G06V 30/142 |
| | | | | 348/207.1 |
| 2012/0263154 | A1 | 10/2012 | Blanchflower et al. | |
| 2013/0050258 | A1* | 2/2013 | Liu | G06F 3/013 |
| | | | | 345/633 |
| 2013/0135180 | A1 | 5/2013 | Mcculloch et al. | |
| 2013/0135295 | A1 | 5/2013 | Li et al. | |
| 2013/0155106 | A1* | 6/2013 | Rolleston | G06T 19/006 |
| | | | | 345/633 |
| 2013/0182858 | A1* | 7/2013 | You | G06F 3/167 |
| | | | | 381/58 |
| 2013/0234933 | A1* | 9/2013 | Reitan | G06F 3/011 |
| | | | | 345/156 |
| 2013/0249948 | A1* | 9/2013 | Reitan | G06T 19/00 |
| | | | | 345/633 |
| 2013/0335303 | A1* | 12/2013 | Maciocci | G02B 27/017 |
| | | | | 345/8 |
| 2014/0002444 | A1 | 1/2014 | Bennett et al. | |
| 2014/0028712 | A1* | 1/2014 | Keating | G06V 20/64 |
| | | | | 345/633 |
| 2014/0225924 | A1* | 8/2014 | Loxam | G09G 5/14 |
| | | | | 345/633 |
| 2015/0070347 | A1* | 3/2015 | Hofmann | G06F 3/0346 |
| | | | | 345/419 |
| 2015/0109339 | A1* | 4/2015 | Jin | G06V 20/20 |
| | | | | 345/633 |
| 2015/0178567 | A1 | 6/2015 | Baek et al. | |
| 2015/0279106 | A1 | 10/2015 | Blanchflower et al. | |
| 2017/0154242 | A1 | 6/2017 | Blanchflower et al. | |
| 2018/0350144 | A1 | 12/2018 | Rathod | |
| 2018/0357830 | A1 | 12/2018 | Blanchflower et al. | |
| 2020/0134928 | A1 | 4/2020 | Blanchflower et al. | |

OTHER PUBLICATIONS

International Preliminary Report on Patentability issued for PCT Application No. PCT/EP2012/070893, mailed May 7, 2015, 6 pages.

Zhong et al., "Designing a Vision-Based Collaborative Augmented Reality Application For Industrial Training [Entwurf einer kollaborativen Augmented-Reality-Anwendung für industrielles Training (Designing a Vision-based Collaborative Augmented Reality Application for Industrial Training)]," IT—Information Technology Oldenbourg Wissenschaftsverlag, Munchen, Germany, vol. 45, No. 1, Feb. 1, 2003, pp. 7-19, XP008162329.

Montoya et al., "Remote Collaboration With Augmented And Virtual Reality Interfaces," 2007 International Conference On Computer Graphics & Virtual Reality, CSREA Press, Las Vegas. NV, Jan. 1, 2007, pp. 81-86, XP008162325.

Ajaj et al., "User Collaboration for 3D Manipulation through Multiple Shared 2D and 3D Views," (Research Paper), In Proceedings, Virtual Reality International Conference, Apr. 18-20, 2007, pp. 245-253.

Office Action issued for U.S. Appl. No. 14/437,165, mailed Jun. 24, 2016, 11 pages.

Office Action issued for Chinese Patent Application No. 201280077916. 6, mailed Jan. 3, 2017, 18 pages.

Office Action issued for U.S. Appl. No. 15/430,143, mailed Sep. 19, 2017, 14 pages.

Office Action issued for U.S. Appl. No. 15/430,143, mailed Mar. 13, 2018, 10 pages.

Notice of Allowance issued for U.S. Appl. No. 15/430,143, mailed May 2, 2018, 7 pages.

Examination Report issued for European Patent Application No. 12 791 112.1, mailed Sep. 10, 2018, 8 pages.

Oshima et al., "AR2Hockey: A Case Study of Collaborative Augmented Reality", IEEE 1998, XP010268738, pp. 268-275.

Notice of Allowance issued for U.S. Appl. No. 16/056,074, mailed Sep. 6, 2019, 16 pages.

Office Action issued for U.S. Appl. No. 16/732,673, mailed Oct. 7, 2020, 9 pages.

Notice of Allowance issued for U.S. Appl. No. 16/732,673, mailed Mar. 8, 2021, 11 pages.

* cited by examiner

COLLABORATIVE AUGMENTED REALITY

CROSS-REFERENCE TO RELATED APPLICATIONS

This application is a continuation of, and claims a benefit of priority under 35 U.S.C. § 120 from, U.S. patent application Ser. No. 17/971,848, filed Oct. 24, 2022, entitled "COLLABORATIVE AUGMENTED REALITY," which is a continuation of, and claims a benefit of priority under 35 U.S.C. § 120 from, U.S. patent application Ser. No. 17/355,159, filed Jun. 22, 2021, issued as U.S. Pat. No. 11,508,136, entitled "COLLABORATIVE AUGMENTED REALITY," which is a continuation of, and claims a benefit of priority under 35 U.S.C. § 120 from, U.S. patent application Ser. No. 16/732,673, filed Jan. 2, 2020, issued as U.S. Pat. No. 11,074,758, entitled "COLLABORATIVE AUGMENTED REALITY," which is a continuation of, and claims a benefit of priority under 35 U.S.C. § 120 from, U.S. patent application Ser. No. 16/056,074, filed Aug. 6, 2018, issued as U.S. Pat. No. 10,535,200, entitled "COLLABORATIVE AUGMENTED REALITY," which is a continuation of, and claims a benefit of priority under 35 U.S.C. § 120 from, U.S. patent application Ser. No. 15/430,143, filed Feb. 10, 2017, issued as U.S. Pat. No. 10,068,381, entitled "COLLABORATIVE AUGMENTED REALITY," which is a continuation of, and claims a benefit of priority under 35 U.S.C. § 120 from, U.S. patent application Ser. No. 14/437,165, filed Apr. 20, 2015, issued as U.S. Pat. No. 9,607,438, entitled "COLLABORATIVE AUGMENTED REALITY," which is a 35 U.S.C. 371 national stage application of International Application No. PCT/EP2012/070893, filed Oct. 22, 2012. All applications referenced in this paragraph are fully incorporated by reference herein for all purposes.

BACKGROUND

Augmented reality provides a presentation of a physical, real-world environment that is augmented by additional information, such as audio data, video data, image data, text data, and so forth. For example, a camera of an electronic device can capture the image or video of a physical target. An augmented reality presentation of the physical target can then be displayed by the electronic device, where the augmented reality presentation of the physical target includes the image or video of the physical target, along with additional data such as any of those listed above.

BRIEF DESCRIPTION OF THE DRAWINGS

Some embodiments are described with respect to the following figures.

DETAILED DESCRIPTION

Figure 1:
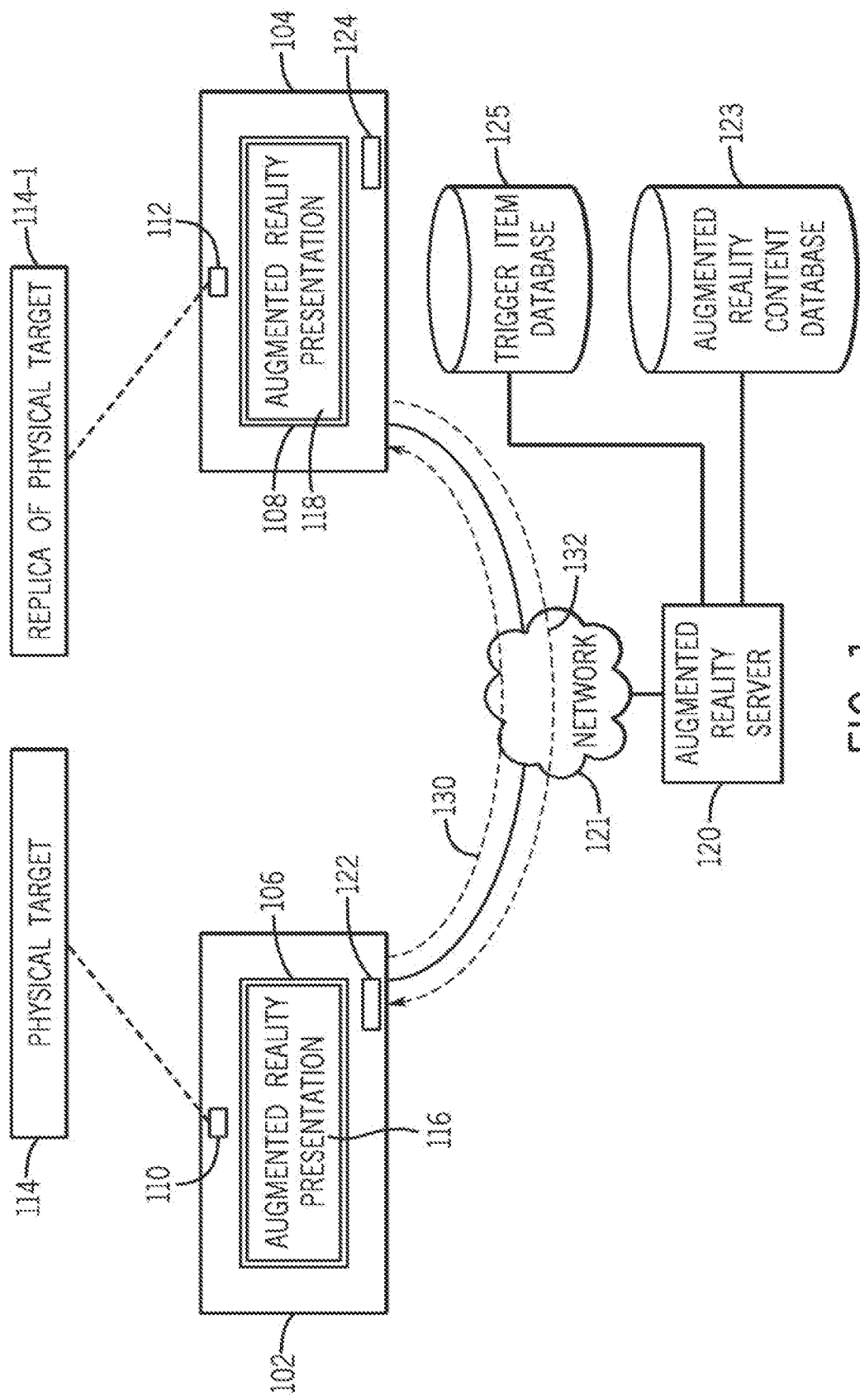
FIG. 1 illustrates an example arrangement that includes multiple electronic devices associated with displays that can display augmented reality presentations of a collaborative augmented reality session, in accordance with some implementations.

Generally, an augmented reality presentation can be created in response to capture of an image or video of a real-world physical target. As examples, the physical target can be a picture in a magazine or newspaper, a picture on a product box, a geographic landmark, and so forth. A user can point the camera of an electronic device at the physical target, and in response to the capture (image capture or video capture) of the physical target, the electronic device can produce an augmented reality presentation that is based on the physical target.

The augmented reality presentation can include a visual output containing an image or video triggered based on the captured physical target, augmented with additional information (hereinafter referred to as "augmented reality content"). The augmented reality content can include audio data, further video data, further image data, text data, and so forth, that is added to the visual output. The visual output of the captured physical target can include an image or video of the captured physical target (the entirety of the captured physical target or a portion of the captured physical target), or a representation of the captured physical target, or different visual content. In cases where the visual output contains an image or video of the captured physical target or representation of the captured physical target, the further video data, further image data, and/or text data can overlay the visual output, while the audio data can be output as sound along with the visual output. An augmented reality presentation can thus be in the form of a multimedia presentation that can include the visual output of the captured physical target in addition to augmented reality content.

As an example, the electronic device when pointed at a given picture in a newspaper or magazine may cause an online electronic game to start playing. The given picture in the newspaper or magazine can be a game character, an advertisement, or other information associated with the online electronic game. The capture of such game character or other game information by the camera of the electronic device provides a trigger to the electronic device to start the online electronic game. As another example, the captured physical target can be a geographic landmark. Based on the capture of the geographic landmark, an augmented reality presentation can be triggered that can provide a virtual tour of the geographic landmark, augmented with image or video data, audio data, and/or text data that explain the historical significance of various aspects of the geographic landmark.

As a further example, the electronic device can capture a chess board, which can cause a chess game to come to life in an augmented reality presentation such that a user can start playing chess. As yet another example, the electronic device can capture a canvas, which can trigger an augmented reality presentation to allow paint brushes to be virtually made on the canvas. In other examples, other types of augmented reality presentations can be triggered by the capture of other types of physical targets.

Traditionally, efficient mechanisms to allow for collaboration among multiple users in the augmented reality context have not been provided. In some cases, multiple users may have to share the same electronic device to look at a particular augmented reality presentation.

In accordance with some implementations, collaborative augmented reality techniques or mechanisms are provided to allow for users at multiple different electronic devices to collaborate with each other with respect to augmented reality presentations presented at each of the electronic devices. FIG. 1 depicts an example arrangement that includes electronic devices 102 and 104. Although just two electronic devices are depicted in FIG. 1, it is noted that in alternative implementations, more than two electronic devices can be employed. The electronic devices 102 and 104 can be located in the same room, or alternatively, the electronic devices 102 and 104 can be remotely located from each other, such as in different locations of a city, different cities of a country, or different locations across the world.

In some examples, the electronic devices 102 and 104 can include any of the following: computers (e.g. tablet computers, notebook computers, desktop computers, etc.), personal digital assistants, smartphones, and so forth. The electronics devices 102 and 104 can have respective displays 106 and 108. In other examples, the displays associated with respective electronic devices can be separate from the electronic devices. For example, an electronic device can be a game appliance, a set top box, or other device that is connected to an external display.

As further depicted in FIG. 1, the electronic devices 102 and 104 also include respective cameras 110 and 112. The cameras 110 and 112 can be used to capture the image or video of a physical target to provide a visual output of the physical target. Both electronic devices 102 and 104 can capture an identical physical target 114. Alternatively, in implementations where the electronic devices 102 and 104 are located remotely from each other, the electronic device 102 can capture the physical target 114, while the remotely located electronic device 104 can capture a replica 114-1 of the physical target 114. For example, if the physical target is a picture on a newspaper or magazine, then the replica 114-1 can be the same picture on another copy of the same newspaper or magazine.

In some examples, assuming that an augmented reality application is running in each of the electronic devices 102 and 104, the capture of certain physical targets by the respective camera 110 or 112 can trigger the electronic device 102 or 104 to present an augmented reality presentation 116 or 118 based on the captured physical target.

The electronic devices 102 and 104 can store information relating to candidate trigger items that can trigger augmented reality presentations. Upon capturing an image or video of a physical target, the electronic device can compare the image or video to the candidate trigger items to determine whether or not an augmented reality presentation should be triggered.

The information relating to candidate trigger items can be obtained from an augmented reality server 120, which is able to access a trigger item database 125 that stores information regarding a collection of candidate trigger items. The electronic devices 102 and 104 are coupled to the augmented reality server 120 over a network 121. The network 121 can be a local area network (LAN), wide area network (WAN), a wireless network, or some combination of the foregoing.

At least a portion of the information in the trigger item database 125 can be communicated to each electronic device 102 or 104 and stored locally at the electronic device 102 or 104. The electronic device 102 or 104 can thus compare characteristics of the captured image or video of the physical target to the locally stored candidate trigger item information to determine whether or not a match is detected, such that a corresponding augmented reality presentation is triggered.

In alternative examples, the comparison of the captured image or video of the physical target to the candidate trigger item information can be performed at the augmented reality server 120.

In performing the comparison of the captured image or video of the physical target to candidate the trigger item information (at the electronic device or augmented reality server), various features from the captured image or video can be extracted for matching to corresponding features of candidate trigger items contained in the candidate trigger item information. A match to a particular candidate trigger item causes a corresponding augmented reality presentation to be presented at the electronic device 102 or 104.

In the triggered augmented reality presentation, a visual output of the physical target 114 (or replica 114-1) is presented, along with corresponding augmented reality content. The augmented reality content can be retrieved from an augmented reality content database 123. In some examples, the augmented reality content can be retrieved by the augmented reality server 120 from the augmented reality content database 123 and communicated to the electronic device 102 or 104 for inclusion in the triggered augmented reality presentation 116 or 118. As noted above, the augmented reality content can include any or some combination of the following: audio data, video data, image data, text data, etc.

In some examples, the augmented reality content database 123 and the trigger item database 125 are stored in a storage subsystem of the augmented reality server 120. Alternatively, either or both of the augmented reality content database 123 and trigger item database 125 can be located at a remote system accessible by the augmented reality server 120 or the electronic devices 102 and 104 over the network 121.

In accordance with some implementations, upon detecting that the electronic devices 102 and 104 have captured a video output of the same physical target (where capturing the same physical target can refer to both the electronic devices 102 and 104 capturing the identical physical target 114, or capturing the physical target 114 and replica 114-1 of the physical target, respectively), a collaborative augmented reality session can be initiated. In the collaborative augmented reality session, multiple users of the electronic devices 102 and 104 are able to interact or collaborate with each other with respect to the augmented reality presentations 116 and 118.

The collaborative augmented reality session can be indicated by the augmented reality server 120 in response to the augmented reality server 120 detecting that the electronic devices 102 and 104 have captured the same physical target. Upon such detection, the augmented reality server 120 can provide an indication to the electronic devices 102 and 104 that the augmented reality presentations 116 and 118 are part of the same collaborative augmented reality session.

Alternatively, the detection that the augmented reality presentations 116 and 118 are based on capture of the same physical target can be performed by the electronic devices 102 and 104, rather than by the augmented reality server 120. For example, the electronic devices 102 and 104 can communicate with each other to communicate information regarding capture of physical targets such that one or both of the electronic devices 102 and 104 can compare the captured physical targets. When the electronic devices 102 and 104 are located in close proximity, the electronic devices 102 and 104 can use near-field communications (radio communications between devices in close proximity), Bluetooth communications, infrared communications, and so forth. When the electronic devices 102 and 104 are remotely located from each other, the electronic devices 102 and 104 can communicate over the network 121 or over another longer-range communications link.

In the collaborative augmented reality session, the users at the electronic devices 102 and 104 can make collaborative inputs to the respective augmented reality presentations 116 and 118 that may cause modification of the respective augmented reality presentations. As an example, if the augmented reality presentations 116 and 118 are presentations of an online electronic game, then the collaborative input from each user can be a game control input that causes game pieces to perform target actions. During the course of playing of the online electronic game, user interactions with the game at the electronic devices 102 and 104, including movement of game pieces and activation of game play controls, can be communicated between the electronic devices 102 and 104 using any of a number of communications techniques, such as near-field communications, Bluetooth communications, infrared communications, communications through the network 121, communications through the augmented reality server 120, and so forth.

As another example, if the augmented reality presentations 116 and 118 are part of a collaborative session relating to a canvas on which a picture is to be painted, the collaborative input from a user can include paint brush strokes on the canvas, which are to be reflected in both augmented reality presentations 116 and 118. There can be various other examples of collaborative inputs for other types of augmented reality presentations.

Collaborative inputs can be accomplished by use of user input devices at the respective electronic devices 102 and 104. As examples, the displays 106 and 108 can be touchscreen displays that are sensitive to user touch. As further examples, the electronic devices 102 and 104 can include respective user input devices 122 and 124, such as mouse devices, buttons, touchpads, keyboards, voice or other audio input devices, and so forth.

In response to a collaborative input received at a particular electronic device that causes modification of the respective augmented reality presentation, information relating to the modification can be propagated to the other electronic device(s) in the same collaborative augmented reality session to cause the corresponding modification of the augmented reality presentation at the other electronic device(s). As depicted in FIG. 1, if the augmented reality modification is made to the augmented reality presentation 116 at the electronic device 102 in response to a user input, information regarding the augmented reality modification can be communicated (at 130) to the other electronic device 104.

The communication of the information regarding the augmented reality modification can be provided directly between the electronic devices 102 and 104, or alternatively, can pass through the augmented reality server 120. Similarly, when a modification is made of the augmented reality presentation 118 at the electronic device 104 based on user input, information regarding the augmented reality modification can be communicated (at 132) from the electronic device 104 to the electronic device 102, to cause the corresponding modification to be made to the augmented reality presentation 116 at the electronic device 102.

In some examples, the augmented reality presentations 116 and 118 that are part of the same collaborative augmented reality session can provide different perspectives of the physical target 114 or replica 114-1. The augmented reality presentations 116 and 118 can be virtual three-dimensional (3D) presentations of the captured physical target, as augmented with the respective augmented reality content. Depending upon the corresponding pose (position and angle) of the electronic device 102 or 104 with respect to the captured physical target, the perspective provided by each of the augmented reality presentations 116 and 118 can be different.

Moreover, it is possible for a user to move around with the electronic device 102 or 104 during the collaborative augmented reality session. Such movement of the electronic device 102 or 104 can be tracked. The collaborative augmented reality presentation 116 or 118 at the respective electronic device 102 or 104 that is moving around can change (in perspective, for example) based on the detected pose of the electronic device 102 or 104 relative to the captured target.

Figure 2:
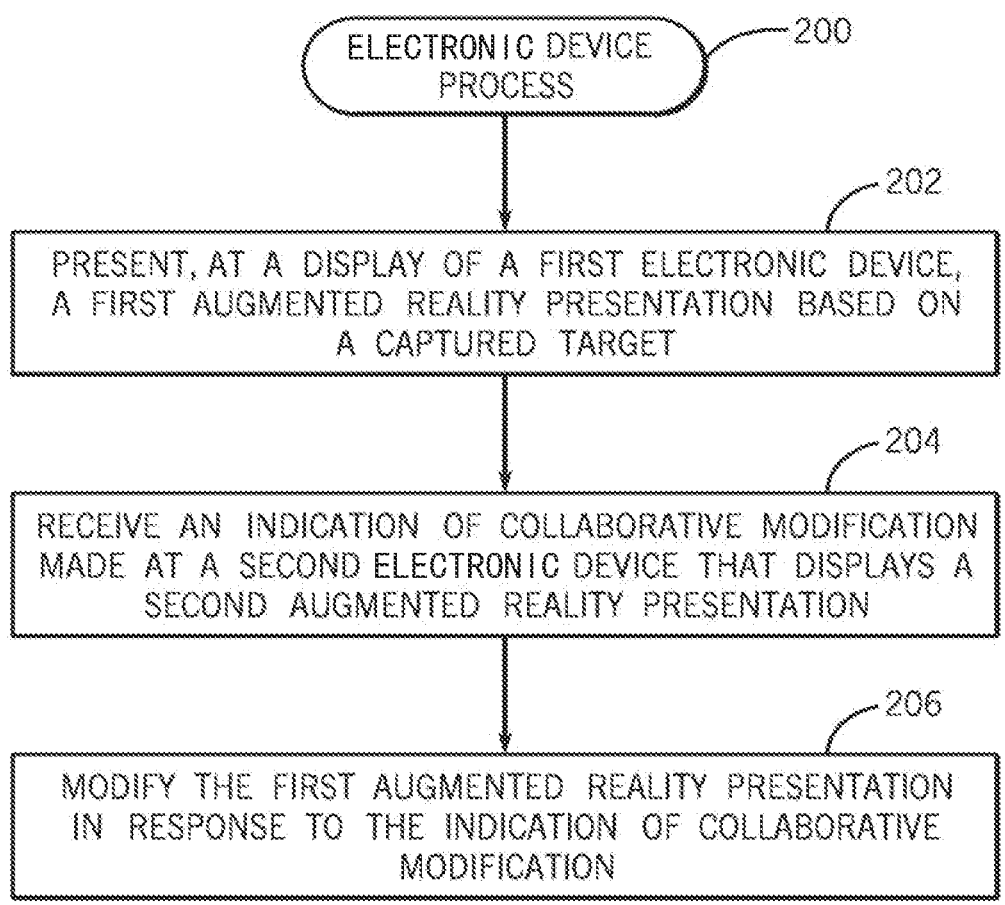
FIG. 2 is a flow diagram of a process of an electronic device that is able to display a collaborative augmented reality presentation, in accordance with some implementations.

FIG. 2 is a flow diagram of a process 200 performed at a first electronic device (e.g. 102 or 104) in accordance with some implementations. The process 200 presents (at 202), at a display associated with the first electronic device, a first augmented reality presentation based on a physical target captured by a camera of the first electronic device. It is assumed that the first augmented reality presentation is part of a collaborative augmented reality session that involves multiple electronic devices (e.g. 102 and 104).

The process 200 further receives (at 204) an indication of collaborative modification made at a second electronic device that displays a second augmented reality presentation (which is part of the collaborative augmented reality session) based on the same physical target. The indication of collaborative modification is provided in response to a user input at the second electronic device that causes modification of the second augmented reality presentation.

The process 200 then modifies (at 206) the first augmented reality presentation in response to the indication of the collaborative modification.

Although reference is made to a process that involves two electronic devices, it is noted that a similar process can be extended to a collaborative augmented reality session that involves more than two electronic devices.

Figure 3:
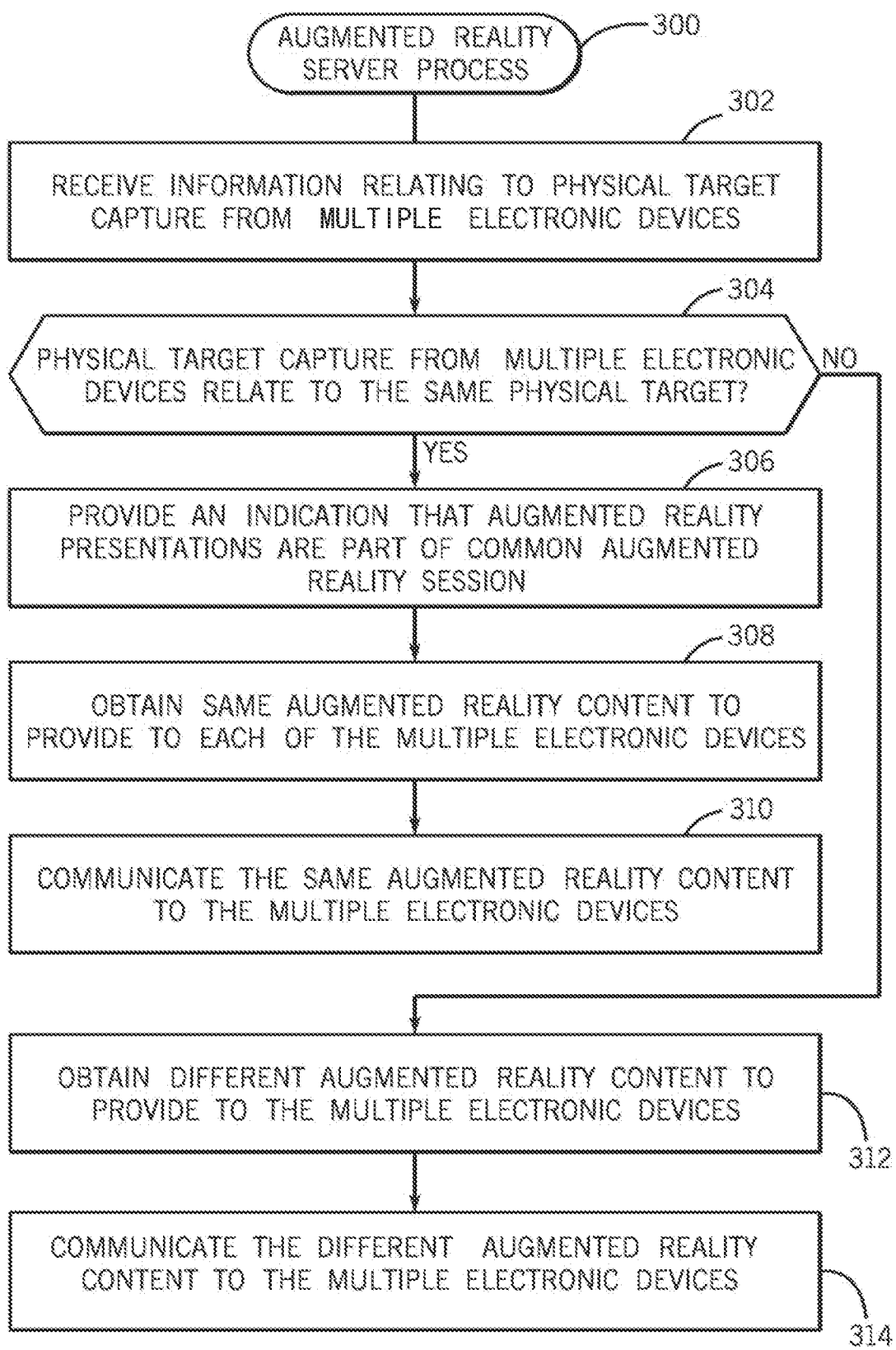
FIGS. 3 and 4 are flow diagrams of processes performed by an augmented reality server to support a collaborative augmented reality session, in accordance with some implementations.

FIG. 3 is a flow diagram of a server process 300 performed by the augmented reality server 120, in accordance with some implementations. The server process 300 receives (at 302) information relating to a physical target capture from multiple electronic devices, which has triggered the generation of respective augmented reality presentations at the corresponding electronic devices. In some implementations, the information relating to the physical target capture from a particular electronic device can include information identifying a trigger item matching the captured physical target.

The server process 300 then determines (at 304) whether the physical target capture from the multiple electronic devices relate to the same physical target. In some examples, this can be based on comparing the identified trigger items from the multiple electronic devices, and determining whether the identified trigger items are the same.

If the physical target capture from the multiple electronic devices relate to the same physical target, then the server process 300 provides (at 306) an indication that the triggered augmented reality presentations at the electronic devices are part of a common collaborative augmented reality session. The indication can be communicated to the multiple electronic devices. For the indicated collaborative augmented reality session, the multiple electronic devices would respond to any collaborative input that modifies a respective augmented reality presentation by communicating information pertaining to the modification to the other electronic device(s) that is (are) part of the indicated collaborative augmented reality session.

For the indicated collaborative augmented reality session, the server process 300 obtains (at 308) the same augmented reality content to provide to each of the multiple electronic devices for augmenting the augmented reality presentations at the multiple electronic devices. The obtained augmented reality content is then communicated (at 310) to the multiple electronic devices.

If the server process 300 determines (at 304) that the physical target capture from the multiple electronic devices relate to different physical targets, then the server process 300 obtains (at 312) different augmented reality content to communicate (at 314) to the respective multiple electronic devices. In this latter scenario, the augmented reality presentations at the multiple electronic devices are not part of the same collaborative augmented reality session.

Figure 4:
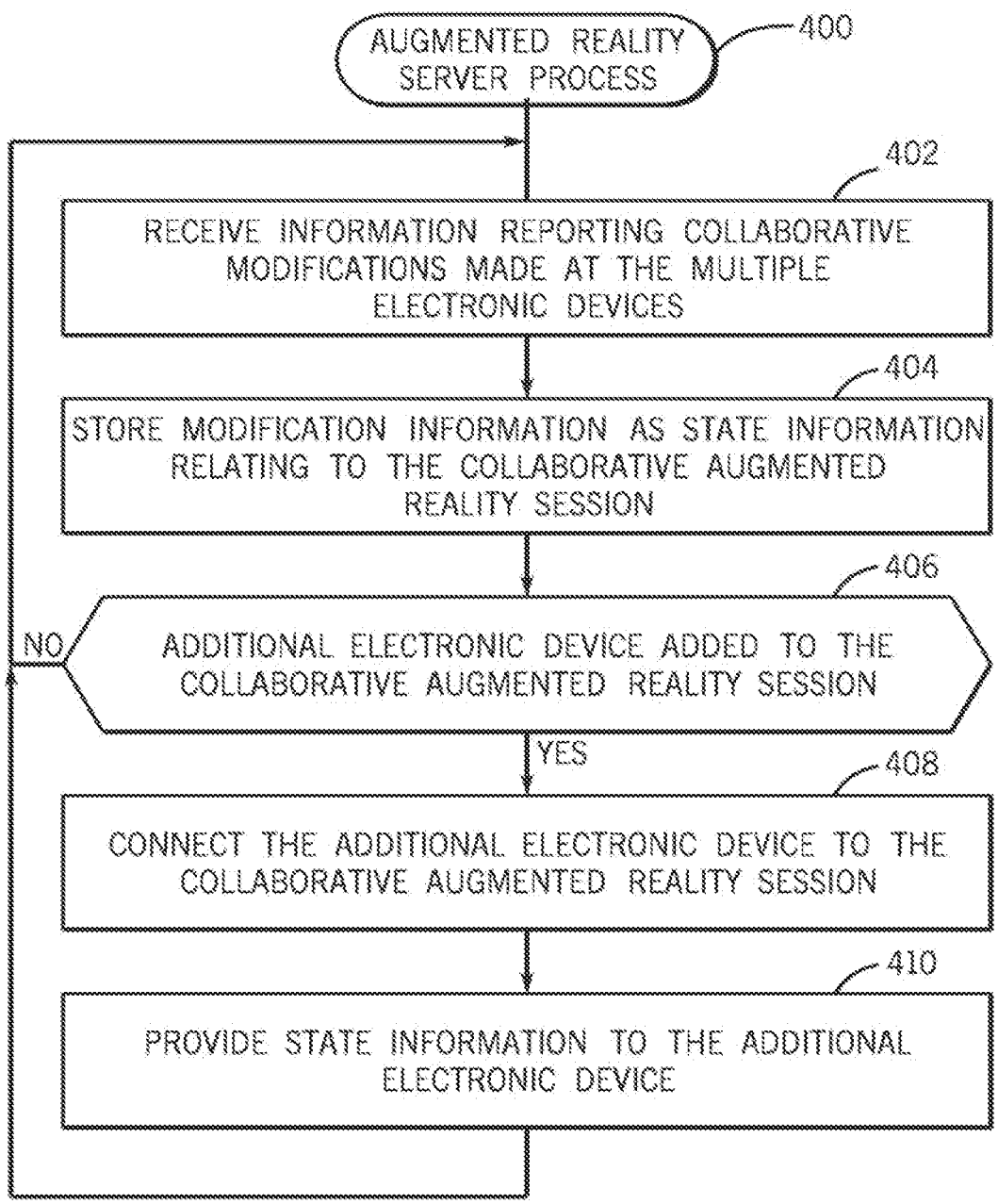

FIG. 4 is a flow diagram of another server process 400 that can be performed by the augmented reality server 120 of FIG. 1. During a collaborative augmented reality session that involves multiple electronic devices, the server process 400 can receive (at 402) information reporting collaborative modifications made at the respective electronic devices. The server process 400 can store (at 404) such modification information as state information relating to the collaborative augmented reality session.

The server process 400 can also determine (at 406) if an additional electronic device has been added to the collaborative augmented reality session. The addition of the additional electronic device to the collaborative augmented reality session can be based on the augmented reality server 120 detecting that a captured physical target by the additional electronic device is the same as or a replica of the captured physical target by the multiple electronic devices that are already part of the collaborative augmented reality session.

In response to such detection, the server process 400 can connect (at 408) the additional electronic device to the collaborative augmented reality session. The server process 400 can then provide (at 410) the state information (regarding the collaborative augmented reality session) to the additional electronic device, such that the additional electronic device can present the same augmented reality presentation (possibly with a different perspective depending on the pose of the additional electronic device relative to the captured physical target) that is seen by the electronic devices that are also part of the same collaborative augmented reality session.

Although the tasks of FIG. 3 or 4 have been described as being part of a server process performed by the augmented reality server 120, it is noted that in other implementations, at least some of the tasks of FIG. 3 or 4 can be performed by one or multiple ones of the electronic devices 102 and 104. For example, one or multiple ones of the electronic devices 102 and 104 may be configured as an augmented reality server to perform portions or all of the functionality of augmented reality server 120.

In alternative implementations, different roles can be assigned to different users involved in a collaborative augmented reality session. As an example, one user can be assigned the role of an administrator, while the remaining users can be participants. An example of where different roles can be assigned can be in the context of an online board game in which the administrator can make modifications in the administrator's augmented reality presentation, and the modifications are communicated to the participant users who can then to respond to the modifications. For example, the user with the administrator role can draw a picture in the online board game, and the users having the participant role are to guess a word that corresponds to the picture that is being drawn.

Other types of roles can be assigned to users in the context of other types of collaborative augmented reality sessions.

Figure 5:
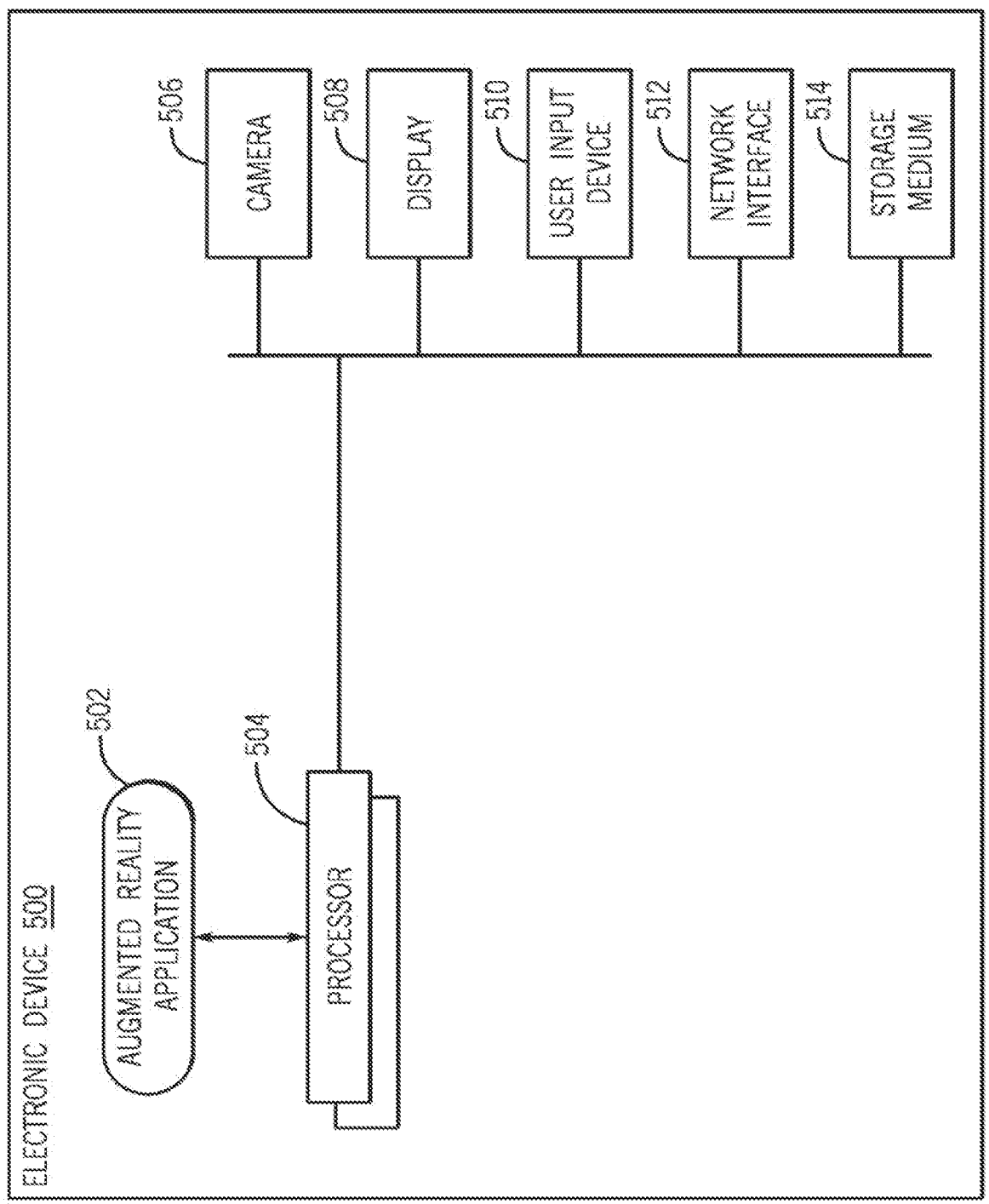
FIG. 5 is a block diagram of an electronic device according to some implementations.

FIG. 5 is a block diagram of an example electronic device 500, in accordance with some implementations. The electronic device 500 can be the electronic device 102 or 104 of FIG. 1. The electronic device 500 includes an augmented reality application 502, which is executable on one or multiple processors 504. The electronic device 500 also includes a camera 506, a display 508, a user input device 510, a network interface 512, and a storage medium (or storage media) 514. The network interface 512 allows the electronic device 500 to communicate over a network, such as the network 121 of FIG. 1.

The augmented reality application 502 can perform the tasks of FIG. 2, as well as other tasks. For example, the augmented reality application 502 can detect the capture of a physical target by the camera 506. In response to the capture of the physical target, the augmented reality application 502 compares features of the captured physical target to candidate trigger item information, which can be stored in the storage medium (media) 514 or retrieved from the trigger item database 125 of FIG. 1. Upon detecting a match of the captured physical target to a corresponding candidate trigger item, the augmented reality application 502 initiates an augmented reality presentation for the matched candidate trigger item for viewing at the display 508. The augmented reality application 502 can further communicate with the augmented reality server 120 of FIG. 1 to obtain augmented reality content to augment the augmented reality presentation.

In addition, the augmented reality application 502 can also receive modification information relating to modification of an augmented reality presentation that is displayed at another electronic device that is part of the same collaborative augmented reality session. In response to the modification information, the augmented reality application 502 can modify the augmented reality presentation presented by the display 508. Moreover, in response to detecting a user input that modifies the augmented reality presentation at the electronic device 500, the augmented reality application 502 can send information pertaining to the modification to other electronic device(s) that is (are) part of the same collaborative augmented reality session.

Figure 6:
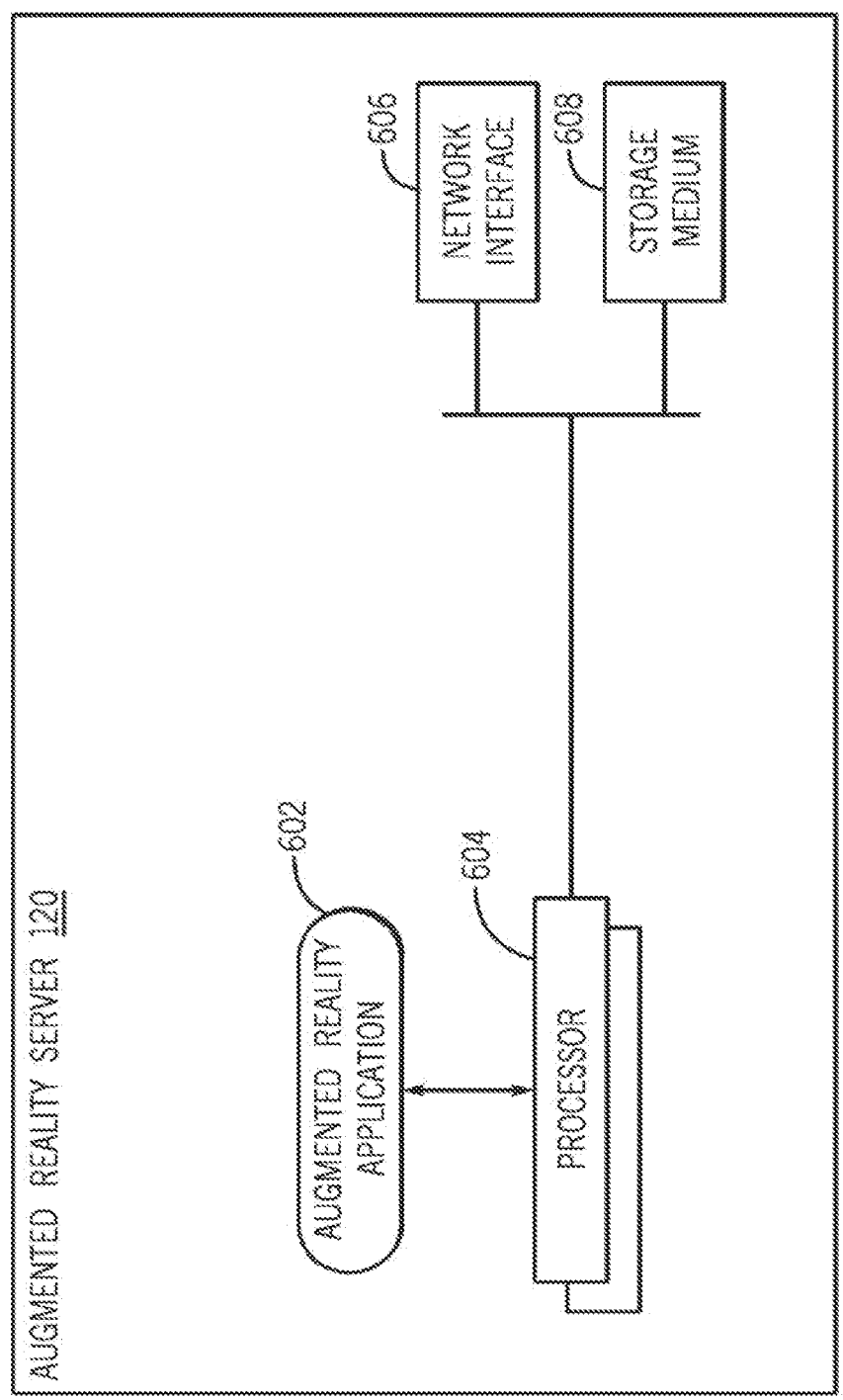
FIG. 6 is a block diagram of an augmented reality server according to some implementations.

FIG. 6 depicts example components of an augmented reality server 120. The augmented reality server 120 includes an augmented reality application 602 that is executable on one or multiple processors 604. The augmented reality server application 602 can perform tasks depicted in FIG. 3 or 4, for example.

The augmented reality server 120 further includes a network interface 606 to allow the augmented reality server 120 to communicate over a network. In addition, the augmented reality server 120 includes a storage medium (or storage media) 608, which can store various information, including the augmented reality content database 123 and trigger item database 125 of FIG. 1.

Machine-readable instructions of the augmented reality application 502 or 602 can be loaded for execution on corresponding processor(s) (such as 504 or 604 in FIG. 5 or 6). A processor can include a microprocessor, microcontroller, processor module or subsystem, programmable integrated circuit, programmable gate array, or another control or computing device.

The storage medium (or storage media) 514 or 608 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact discs (CDs) or digital video discs (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method, comprising:
    capturing, by an electronic device through a camera, at least one of an image or a video of a physical object;
    obtaining, by the electronic device, augmented reality triggering information;
    determining, by the electronic device, whether to start an augmented reality presentation based on comparing the image or the video of the physical object and with the augmented reality triggering information;
    responsive to a determination to start the augmented reality presentation, preparing, by the electronic device, a visual output of the physical object or a portion thereof, the preparing comprising:
        retrieving additional information corresponding to the physical object from a database; and
        augmenting the visual output with the additional information corresponding to the physical object; and
    starting, by the electronic device, the augmented reality presentation comprising the visual output of at least one of the physical object or the portion thereof augmented with the additional information corresponding to the physical object.

2. The method according to claim 1, wherein the additional information corresponding to the physical object comprises audio data, video data, image data, text data, or a combination thereof.

3. The method according to claim 1, wherein the physical object comprises at least one of a printed game character or a print advertisement associated with an electronic game and wherein starting the augmented reality presentation comprises starting the electronic game on the electronic device.

4. The method according to claim 1, wherein the physical object comprises a landmark, wherein the additional information comprises image data, video data, audio data, text data, or a combination thereof that describe the landmark, and wherein starting the augmented reality presentation comprises starting a virtual tour of the landmark.

5. The method according to claim 1, wherein determining whether to start the augmented reality presentation comprises:
    extracting features of the physical object from the image or the video of the physical object; and
    matching the features of the physical object extracted from the image or the video of the physical object with features of candidate trigger items contained in the augmented reality triggering information, wherein the determination to start the augmented reality presentation is based on whether a match to a candidate trigger item is found.

6. The method according to claim 1, wherein the augmented reality triggering information is obtained from a server computer, from a data storage local to the electronic device, or from both the server computer and the data storage local to the electronic device.

7. The method according to claim 1, wherein the additional information corresponding to the physical object is retrieved from the database that is local to the electronic device or that is located at a remote system.

8. An apparatus, comprising:
    one or more processors;
    a camera;
    a non-transitory computer-readable medium storing instructions that, when executed by the one or more processors, cause the one or more processors to:
        capture, through the camera, at least one of an image or a video of a physical object;
        obtain augmented reality triggering information;
        determine whether to start an augmented reality presentation based on comparing the image or the video of the physical object with the augmented reality triggering information;
        responsive to a determination to start the augmented reality presentation, prepare a visual output of the physical object or a portion thereof, the one or more processors further to:
            retrieve additional information corresponding to the physical object from a database; and
            augment the visual output with the additional information corresponding to the physical object; and
        start the augmented reality presentation comprising the visual output of at least one of the physical object or the portion thereof augmented with the additional information corresponding to the physical object.

9. The apparatus of claim 8, wherein the additional information corresponding to the physical object comprises audio data, video data, image data, text data, or a combination thereof.

10. The apparatus of claim 8, wherein the physical object comprises at least one of a printed game character or a print advertisement associated with an electronic game and wherein starting the augmented reality presentation comprises starting the electronic game on the apparatus.

11. The apparatus of claim 8, wherein the physical object comprises a landmark, wherein the additional information comprises image data, video data, audio data, text data, or a combination thereof that describe the landmark, and wherein starting the augmented reality presentation comprises starting a virtual tour of the landmark.

12. The apparatus of claim 8, wherein determining whether to start the augmented reality presentation comprises:
    extracting features of the physical object from the image or the video of the physical object; and
    matching the features of the physical object extracted from the image or the video of the physical object with features of candidate trigger items contained in the augmented reality triggering information, wherein the determination to start the augmented reality presentation is based on whether a match to a candidate trigger item is found.

13. The apparatus of claim 8, wherein the augmented reality triggering information is obtained from a server computer, from a data storage local to the apparatus, or from both the server computer and the data storage local to the apparatus.

14. The apparatus of claim 8, wherein the additional information corresponding to the physical object is retrieved from the database that is local to the apparatus or that is located at a remote system.

15. A computer program product comprising a non-transitory computer-readable medium storing instructions that, when executed by one or more processors, cause the one or more processors to:
    capture, through a camera, at least one of an image or a video of a physical object;
    obtain augmented reality triggering information;
    determine whether to start an augmented reality presentation based on comparing the image or the video of the physical object with the augmented reality triggering information;
    responsive to a determination to start the augmented reality presentation, prepare a visual output of the physical object or a portion thereof, the one or more processors further to:
        retrieve additional information corresponding to the physical object from a database; and
        augment the visual output with the additional information corresponding to the physical object; and
    start the augmented reality presentation comprising the visual output of at least one of the physical object or the portion thereof augmented with the additional information corresponding to the physical object.

16. The computer program product of claim 15, wherein the additional information corresponding to the physical object comprises audio data, video data, image data, text data, or a combination thereof.

17. The computer program product of claim 15, wherein the physical object comprises at least one of a printed game character or a print advertisement associated with an electronic game and wherein starting the augmented reality presentation comprises starting the electronic game on the electronic device.

18. The computer program product of claim 15, wherein the physical object comprises a landmark, wherein the additional information comprises image data, video data, audio data, text data, or a combination thereof that describe the landmark, and wherein starting the augmented reality presentation comprises starting a virtual tour of the landmark.

19. The computer program product of claim 15, wherein determining whether to start the augmented reality presentation comprises:
    extracting features of the physical object from the image or the video of the physical object; and
    matching the features of the physical object extracted from the image or the video of the physical object with features of candidate trigger items contained in the augmented reality triggering information, wherein the determination to start the augmented reality presentation is based on whether a match to a candidate trigger item is found.

20. The computer program product of claim 15, wherein the augmented reality triggering information is obtained from a server computer, from a data storage local to the electronic device, or from both the server computer and the data storage local to the electronic device, and wherein the additional information corresponding to the physical object is retrieved from the database that is local to the electronic device or that is located at a remote system.

* * * * *

UNITED STATES PATENT AND TRADEMARK OFFICE
CERTIFICATE OF CORRECTION

PATENT NO. : 12,299,831 B2
APPLICATION NO. : 18/419264
DATED : May 13, 2025
INVENTOR(S) : Sean Blanchflower et al.

Page 1 of 1

It is certified that error appears in the above-identified patent and that said Letters Patent is hereby corrected as shown below:

In the Claims

In Column 9, Line 46, Claim 1, please replace "object and with" with -- object with --.

Signed and Sealed this
Tenth Day of June, 2025

Coke Morgan Stewart
*Acting Director of the United States Patent and Trademark Office*